March 10, 1953 E. T. BLACK 2,630,725
MULTIPLE CUTTER BORING DEVICE
Filed June 15, 1951
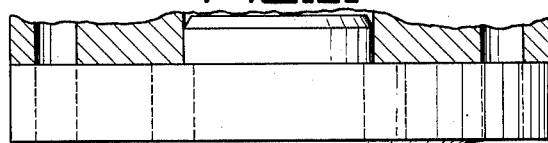
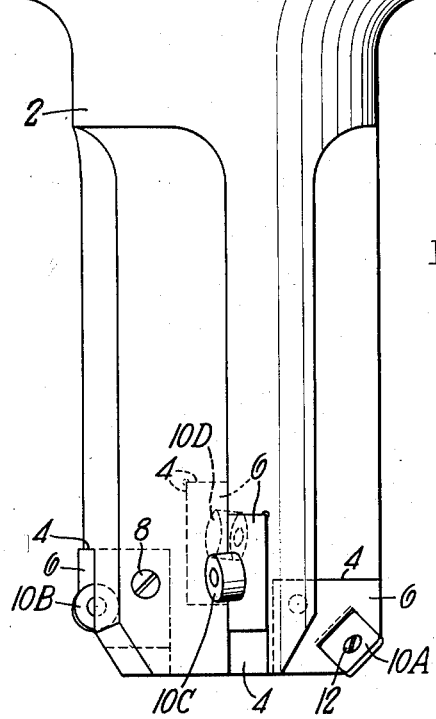
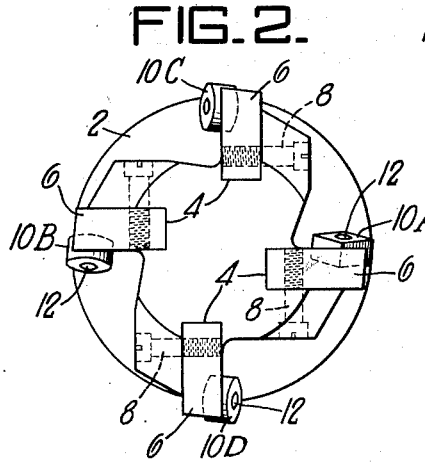
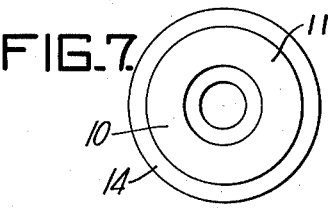
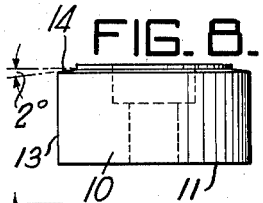
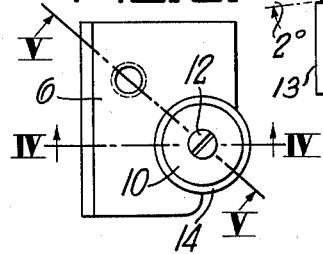
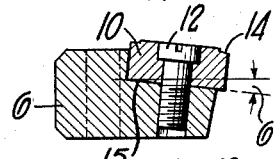
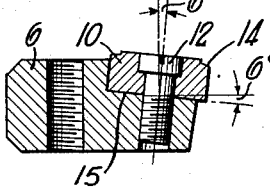
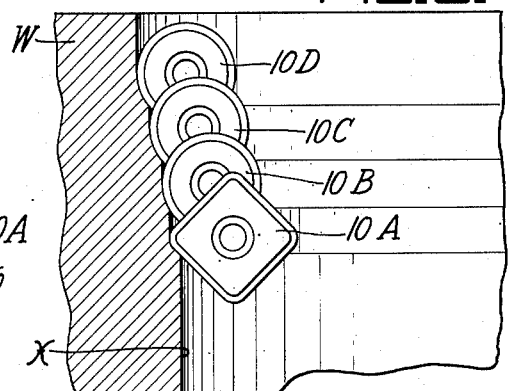
Inventor:
EDWARD T. BLACK,
by: Donald G. Dalton
his Attorney.

Patented Mar. 10, 1953

2,630,725

UNITED STATES PATENT OFFICE 2,630,725

MULTIPLE CUTTER BORING DEVICE

Edward T. Black, Pittsburgh, Pa., assignor to United States Steel Corporation, a corporation of New Jersey Application June 15, 1951, Serial No. 231,727

1 Claim. (Cl. 77—58)

The present invention relates generally to an improved cutting device for increasing the diameter of the bore of a hollow workpiece and more particularly to a multiple cutter tool especially suitable for boring out the hubs of railroad car wheels and the like.

Prior to my invention, a boring operation, such as the boring out of railroad car wheel hubs, required a large supply of individual cutting tools of various sizes. The cutting tool usually consisted of an elongated driver, set in vertical upright position, with a horizontal slot adjacent its lower end having a cutting bar inserted and centrally positioned therein. The cutting bar, which was made of high-speed tool steel, was provided with a cutting edge on both extremities, and was held firmly in position in the slot by means of a wedge.

This type of cutting device required accurate grinding and accurate positioning in the slot of the driver to insure efficient operation. Generally each cutting tool was adapted to cut the hub of the railroad car wheel to the extent of increasing the bore diameter approximately one inch. After this cut was made the cutting assembly had to be replaced with one of larger capacity, consisting of a driver of greater diameter and a longer cutting bar, in order to bore out the hub approximately another inch.

Thus, where it was necessary to increase a bore several inches, as is the case with railroad car wheels, a large number of cutting tool assemblies were required to complete the operation as well as considerable down time for changing tools. In order to minimize the wasted down time the usual practice heretofore has been to process a number of wheels to a given bore diameter for which only one size cutting tool was required and then continue the operation by increasing the size of the cutting tool assemblies for each additional cut in the diameter of the bore. This procedure was followed until the desired finished diameter was obtained. Although the down time for replacing tools was kept to a minimum in this manner, a large space was required to store the car wheels during the progressive processing of their bore diameters.

I propose to eliminate the wasteful down time and the frequent tool changes necessary with the old practice described above by providing a multiple cutter tool which will increase the diameter of the bore of a hollow workpiece to substantially finished size in one cutting operation.

It is accordingly an object of my invention to provide a cutting device carrying a plurality of cutting units so positioned as to permit progressively increasing the inside diameter of a hollow workpiece without requiring a resetting or removing of the cutters.

Another object of the invention is to provide a multiple cutter boring tool having a plurality of cutting units so positioned relative to each other that no one cutting unit is overloaded, so far as cutting action is concerned.

A still further object of my invention is to provide a multiple cutter boring tool wherein the individual cutters are so designed so as to direct the cutting chips away from the work during the boring operation.

Another object of my invention is to provide a multiple cutter boring tool which is simple in construction, efficient in operation and does not require precision setting of the cutting units.

These and other objects will become more apparent after referring to the following specification and attached drawings, in which:

Figure 1 is a side elevation of the reaming device of my invention;

Figure 2 is an end view looking toward the bottom of the cutter shown in Figure 1;

Figure 3 is a side elevation of one of the tool holders of my invention showing the position of the cutter therein;

Figure 4 is a sectional view taken on the line IV—IV of Figure 3;

Figure 5 is a sectional view taken on the line V—V of Figure 3;

Figure 6 is a diagrammatic illustration showing the step-by-step action of the cutters;

Figure 7 is a plan view of the cutter; and

Figure 8 is a side elevation of the cutter shown in Figure 7.

Referring more particularly to the drawings, reference numeral 2 indicates a driver or elongated main body member which is attached by its upper end to a rotatable spindle (not shown). As best shown in Figure 1, the main body 2 is provided with straight flutes and lands. The spindle rotates the driver 2 as it is driven downward through the bore of a workpiece W such as a railroad car wheel, which is being bored to a predetermined diameter. If desired the driver 2 may be fixed and the workpiece rotated as the driver is passed therethrough. A plurality of recesses 4 are provided in the lands at the leading end of the driver 2 equally spaced around its periphery. Each of the recesses 4 lies in a different plane normal to the longitudinal axis of the driver 2 as shown in Figure 1. A tool holder block 6 is removably mounted in each of the recesses 4 by means of a set screw 8. Each of the blocks 6 is disposed in a position generally radial to the main body 2 and in alignment longitudinally therewith. A cutting tool or bit 10A, B, C or D is attached to each of the tool holders 6 by means of a set screw 12. The cutting tools 10A, B, C and D are positioned at various radial distances from the longitudinal axis of the driver 2 with the endmost cutter 10A being located at the shortest radial distance and the remaining cutters being positioned at progressively longer radial distances. The purpose for this arrangement will be explained more fully hereinafter. The cutter bit shown in Figures 3, 4, 5, 7 and 8, which is indicated generally by the reference numeral 10, is typical of each of the cutters of the boring device of my invention. Each of the cutter bits is provided with spaced parallel end faces 11 and a side face 13 normal and complementary thereto.

Each of the cutters is provided with a chip breaker 14 on its cutting face which comprises an outwardly and downwardly sloping step-down portion around the outer periphery thereof. I have found it preferable where the cutting tool is to be used at a feed of .050 inch or more per revolution of either the workpiece or the driver, to grind the step-down portion to a width of $\frac{3}{32}$ of an inch, a depth of .015 inch and with a 2 degree slope toward the outside edge of the cutter.

For best results I have found it desirable to offset the position of the cutters in relation to the tool holders so that each of the cutters 10A, B, C and D is set at an angle of 6 degrees to the longitudinal axis of its tool holder and also at an angle of 6 degrees to the radius of the main body. This is accomplished by providing a recessed seat 15 in a side face of each block. Each seat has its bottom inclined at a 6 degree angle to the longitudinal axis of the block and at a 6 degree angle to the radius of the main body 2. While I have shown the bottom of the recessed seat inclined at angles of 6 degrees, it will be noted that the angle may be varied in accordance with the type of material worked and the speed of feed. The cutter bit in each block is secured in its seat with an end face in flatwise engagement with the bottom of the seat so that the side face of the bit makes the proper rake and clearance angles with the surface of the work when presented thereto.

Through the use of the chip breaker described above, the metal is forced to break in small segments when it is removed from the bore by the cutters. The small segments are caused to flow up the 2 degree slope and impinge against the shoulder of the breaker. This, in conjunction with the angular setting of the cutters, impels the chips in a downward flight away from the cutting tools and guides them through the bore of the hollow workpiece, thus contributing to longer tool life.

While not necessary, it is preferable that the initial and endmost cutting unit 10A be substantially square in order to present a more rigid cutting contact. This is found to be advantageous inasmuch as the initial cut is usually made against a rough surface or, quite often, an eccentric surface, existing in hollow metal workpieces. As the cutting edges of the cutters become worn it is possible to reset them by rotating them a slight amount to present a new cutting edge to the work.

In operation the driver 2 may be rotated and forced downwardly into the bore of the workpiece W. The cutting tool 10A is the first to contact the bore surface X to take the first cutting action. Thereafter, and immediately behind the cutter 10A, lies cutter 10B which starts its cutting action on the resultant surface left by cutter 10A because of its vertical offset. The increased radial distance of cutter 10B causes it to reach out to cut additional metal of a predetermined amount from the bore surface X. The cutting action of cutter 10C is on a cutting plane longitudinally above and radially beyond the cutting area of cutter 10B and, finally, the cutting area of unit 10D is longitudinally above, subsequent to, and radially beyond the cutting area of 10C. This cutting action is clearly shown in the diagrammatic drawing of Figure 6.

Thus, in sequence and step formation, predetermined circular cuts are made from the inside diameter of the bore to the extent that in one rotative motion, cutting units 10A to 10D, inclusive, have, in step formation, radially cut into the metal to enlarge the bore to the desired diameter.

It will be apparent from the above that it is essential to the successful operation of my device that the cutters be offset one from the other both longitudinally and radially as it is this arrangement which permits, in a single revolution of either the workpiece W or the driver 2, production of a series of cuts in step formation so that the single rotation of all four cutters about or against the workpiece provides the desired increase of the bore diameter of the workpiece W. Thus, by a single setting of a multiplicity of cutting units, I am able to cut what heretofore had to be accomplished by a number of individually and radially different cutting bars which required a change in the entire assembly between each of the cuts.

It may be noted when it is desired to cut a relatively large amount of metal from the bore of the workpiece additional sets of cutters may be added to the driver longitudinally above the cutters positioned adjacent the leading edge of the cutter. In any event, however, each of the cutters must lie in a different plane normal to the longitudinal axis of the driver 2 and also be positioned at progressively greater radial distances therefrom.

It will be further noted that the number of cutters about the periphery of the driver may vary from two to any desired number greater than two so long as they are equally spaced and each offset from the other as described above.

While one embodiment of my invention has been shown and described it will be apparent that other adaptations and modifications may be made without departing from the scope of the following claim.

I claim:

A boring device comprising an elongated straight fluted main body providing lands, said lands each having a recess at the leading end of said body, a tool-holder block in each of said recesses positioned generally radial to said body and aligned longitudinally therewith, said block having a recessed seat in a side face thereof accommodating a cutter bit having spaced parallel end faces and a side face normal and complementary thereto, the seat in each of said blocks having its bottom inclined at an angle to the longitudinal axis of said tool-holder block and at an angle to the radius of said main body, said cutter bit being secured in said seat with an end face in flatwise engagement with said bottom whereby the side face of the bit makes the proper rake and clearance angles with the surface of the work when presented thereto.

EDWARD T. BLACK.

REFERENCES CITED

The following references are of record in the file of this patent:

UNITED STATES PATENTS

| Number | Name | Date |
|---|---|---|
| 1,838,520 | Archer | Dec. 29, 1931 |
| 2,204,855 | Healy | June 18, 1940 |
| 2,398,362 | Dare | Apr. 16, 1946 |